H. E. HAYWARD.
POSITIONING DEVICE FOR SILENT CHAIN LINKS.
APPLICATION FILED APR. 24, 1916.
1,256,897.
Patented Feb. 19, 1918.
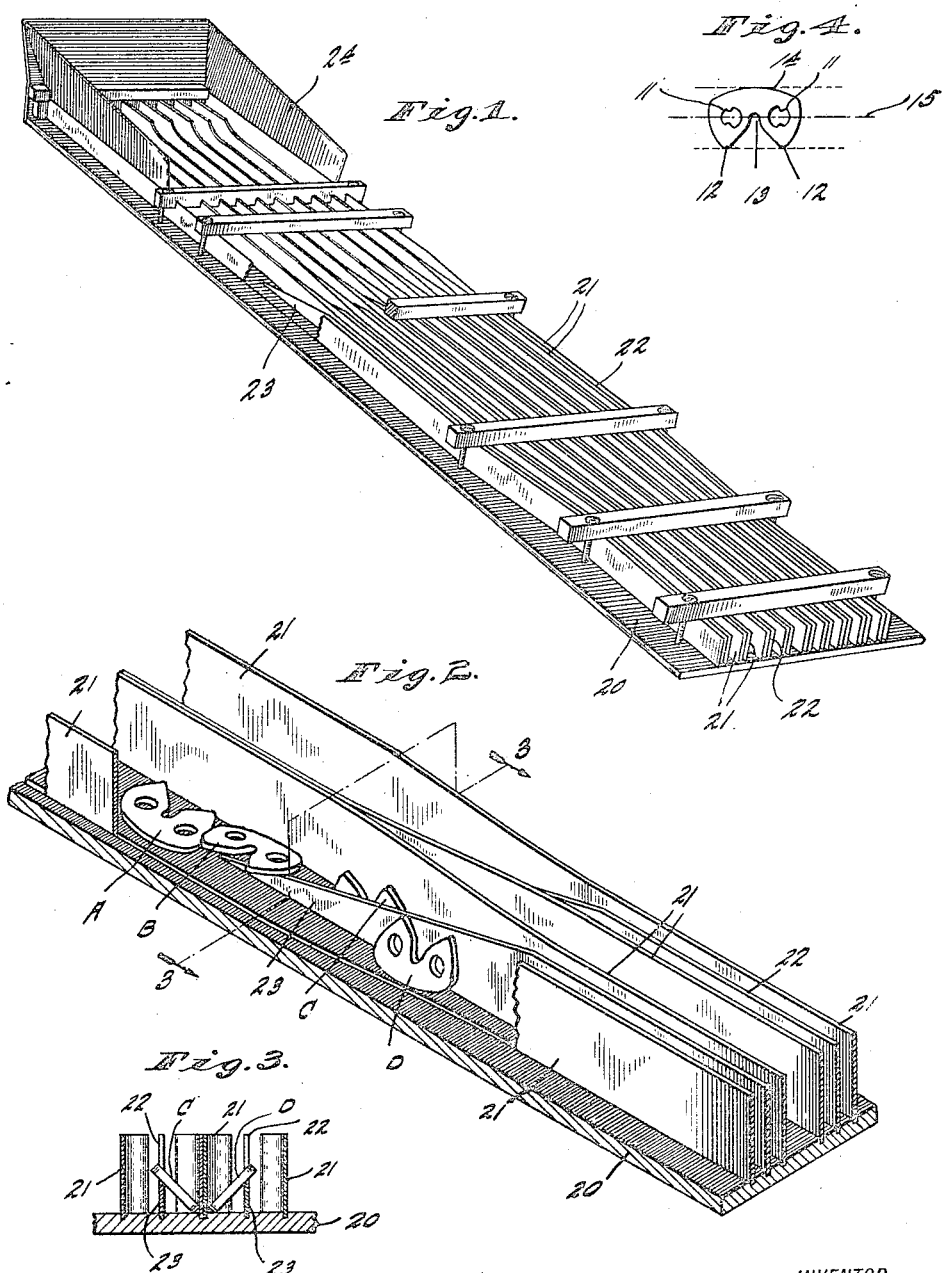
WITNESSES:
Frank A. Sahle
Josephine Gasper
INVENTOR
Henry E. Hayward,
BY
Hood & Schley
ATTORNEYS

UNITED STATES PATENT OFFICE.

HENRY E. HAYWARD, OF INDIANAPOLIS, INDIANA, ASSIGNOR TO LINK-BELT COMPANY, OF CHICAGO, ILLINOIS, A CORPORATION OF ILLINOIS.

POSITIONING DEVICE FOR SILENT CHAIN-LINKS.

1,256,897.

Specification of Letters Patent.

Patented Feb. 19, 1918.

Application filed April 24, 1916. Serial No. 93,320.

*To all whom it may concern:*

Be it known that I, HENRY E. HAYWARD, a citizen of the United States, residing at Indianapolis, in the county of Marion and State of Indiana, have invented a new and useful Positioning Device for Silent Chain-Links, of which the following is a specification.

In the manufacture of silent chains, it is necessary that the links be operated on individually a number of times, in order to produce the finished chain. Heretofore, it has been necessary in practice to place the individual links in position by hand, for each operation, involving great labor and expense, as the links are manufactured and handled by the million.

It is the object of my present invention to bring to a definite position and arrangement silent chain links which are in a haphazard mass; so that after such links are brought to such definite position and arrangement they may be conveyed in suitable position and arrangement to the machine which is next to operate on them. The present invention deals solely with the initial positioning and arranging mechanism; and serves to bring the links of the haphazard mass all to the same position with the links arranged end to end. The links may be fed in this initial arrangement from the positioning device forming the subject-matter of the present application to certain machines for treating the links, usually individually; or may be fed to other devices, such as that shown in my co-pending application Serial No. 93321 or that shown in the co-pending application of Owen H. Spencer, Serial No. 93322, both of even filing date herewith, which transform this initial link arrangement, with the links arranged all in the same position end to end, to a second arrangement or stack of links, with the links arranged side by side with their points registering, which second arrangement is found to be a most convenient and suitable one for transporting the links from one place to another, as on the slide rail forming the subject-matter of the co-pending application of Frank J. Oakes, Serial No. 93326, also of even filing date herewith, and for handling the links in other machines which may operate on them, either individually or in the assembling of the complete chain, as for instance those shown in the co-pending applications of Frank J. Oakes and Owen H. Spencer, Serial Nos. 93324 and 93325, also of even filing date herewith. The various inventions covered by these several applications may be used together in different arrangements in the manufacture of silent chains.

The accompanying drawing illustrates my invention. Figure 1 is a perspective view of a positioning and arranging apparatus embodying my invention; Fig. 2 is an enlarged fragmentary perspective view of a portion of this same apparatus; Fig. 3 is a section on the line 3—3 of Fig. 2; and Fig. 4 is an elevation of a silent chain link with its points downward.

My positioning device operates by gravity. Silent chain links are usually punchings of sheet metal, of greater general length than width, symmetrical about the transverse medial line but unsymmetrical both in form and weight about the longitudinal medial line. By reason of this unsymmetricality, the center of gravity of the link is to one side of this longitudinal medial line. In consequence, if the link is lifted by a narrow support extending along this longitudinal medial line, the center of gravity of the link is on one side of such medial support, and the part of the link on that side will tip downward so that the part on the other side tips upward.

This is illustrated by the silent chain link shown in Fig. 4. The longitudinal or horizontal dimension of the link is greater than its transverse or vertical dimension. The two ends of the link are alike, each end being provided with a hole 11 of any suitable shape for receiving a pivot pin. At its lower edge the link is provided with two points 12, between which is a crotch 13. The top or back 14 of the link is usually curved, and usually is not cut out by a crotch. In consequence, because the crotch 13 projects in from one edge and no similar crotch projects in from the other, the back portion of the link, or the portion above the longitudinal medial line 15 in Fig. 4, is heavier than the point or lower edge of the link; or in other words the center of gravity of the link is above such longitudinal medial line 15 in the link shown.

My positioning device is conveniently made in multiple, so that it can act on a considerable number of links at the same time. It comprises a base 20 and sheet metal strips 21 and 22 projecting from the upper face of the base and substantially perpendicular thereto. The base 20 is usually inclined, so that gravity will slide the links along its upper surface. The strips 21 and 22 extend generally longitudinally of the base 20. Two sheet metal strips 21 and the strip 22 between them, coöperating with the base 20 below, constitute a unitary positioning means, which may be duplicated in the apparatus to as great an extent as desired; Fig. 1 shows nine of these unitary positioning means. The strips 21 extend the full length of the base 20; but the strips 22 extend only a portion of the length of such base, terminating short of the upper end of the base 20 in a plow point 23 which conveniently is merely the upper end of the strip 22 having its upper edge cut away obliquely so that the extreme point of such upper edge comes flush with or below the upper surface of the base 20. Preferably, the strips 22 project entirely to the lower end of the base 20. The two strips 21 of each unitary positioning means are spaced apart above the plow point 23 a distance just greater than the width—or vertical dimension in Fig. 4—of the link, so that they will receive between them with just sufficient clearance to prevent binding a link lying flat on the base 20 and having its longitudinal dimension extending along the trough formed by such strips 21, as shown by the link A in Fig. 2. The width of this trough is not great enough to receive links with their longitudinal dimension transverse to the trough. The several troughs formed by the several unitary positioning means touch one another at the upper part of the base 20, by reason of the coming together of the strips 21 of adjacent unitary positioning means at such upper part; and a flaring sided hopper 24 is provided at the upper end and partly along the two sides, so that links can be thrown haphazard into such hopper and will drop into the troughs formed by the strips 21. These links will fall into these troughs and position themselves by gravity flatwise in the troughs with their longitudinal dimensions lengthwise thereof, as illustrated by the link A in Fig. 2. The points 12 of the links may be toward either side of the trough, depending wholly on chance. At the plow point 23, the two strips 21 of each unitary positioning means converge toward the central strip 22, so that at about the place where the plow point reaches the full height of the strip 22 the space between such strip 22 and the strip 21 on each side is just sufficient to receive a link edgewise, with sufficient clearance for sliding.

In operation, the links are thrown into the hopper 24 and fall into the troughs provided by the strips 21 and take a flatwise position in the bottom of such troughs, as shown by the link A in Fig. 2. These links are slid down along these troughs in any suitable manner, as by gravity if the troughs are inclined. As they slide, they come against the plow points 23, and slide up on the edges of such plow points, which extend along the longitudinal medial lines 15 of the links. The link B in Fig. 2 is shown as just beginning to slide up on the plow point 23. The center of gravity of the link as it slides along the plow point 23 is on the opposite side of such plow point from the link points 12, so that the back 14 of the link remains down against the upper surface of the base 20 and the points 12 are tilted up, as illustrated by the links C and D of Figs. 2 and 3. As the link continues to slide down along the base 20, the tilting continues until the link is wholly on one side or the other of the plow point 23, depending on which side of such plow point the back 14 of the link was initially located. When this position is reached, the space between the plow point 23 or the strip 22 and the strip 21 on each side is just sufficient to hold the link in this tilted position, with the points upward. The links slide along the troughs formed by the strips 21 and 22 to the lower end of the base 20, and may thence be disposed of by apparatus forming the subject-matter of other inventions. The narrow troughs between the strips 22 and the adjacent strips 21 are of sufficient length between the plow points 23 and the lower end of the base 20 to afford considerable storage capacity, whereby links may pile up in such narrow troughs with their points upward and with the links arranged end to end and abutting one another. These troughs are so narrow that it is impossible for the links to overlap in them. These narrow troughs in which the links are supported edgewise with their points upward may be curved and twisted as desired, and the links will slide along them, by gravity if the slope be sufficient.

I claim as my invention:

1. A positioning device for silent chain links, comprising a trough of proper width at one end to allow a silent chain link to lie longitudinally flatwise therein but to prevent it from lying crosswise therein, so that the points of the link are necessarily toward one side or the other of the trough, and a medial longitudinal vertical partition in said trough, said partition terminating short of the aforesaid end of the trough in a narrow plow point formed by having its upper end extend at an oblique angle to the bottom of the trough to the plane of the under surface of a link lying in the trough so that as a link slides along the trough said plow point projects under it along its longitudinal medial line and tilts one edge of the link upward to bring the link toward an upright position on the other side of said partition from that on which said edge originally lay.

2. A positioning device for silent chain links, comprising a trough of proper width at one end to allow a silent chain link to lie longitudinally flatwise therein but to prevent it from lying crosswise therein, so that the points of the link are necessarily toward one side or the other of the trough, and a medial longitudinal vertical partition in said trough, said partition terminating short of the aforesaid end of the trough in a narrow plow point formed by having its upper edge extend at an oblique angle to the bottom of the trough to the plane of the under surface of a link lying in the trough so that as a link slides along the trough said plow point projects under it along its longitudinal medial line and tilts one edge of the link upward to bring the link toward an upright position on the other side of said partition from that on which said edge originally lay, the sides of said trough converging below the upper end of said plow point.

3. A positioning device for silent chain links, comprising a trough of proper width at one end to allow a silent chain link to lie longitudinally flatwise therein but to prevent it from lying crosswise therein, so that the points of the link are necessarily toward one side or the other of the trough, a medial longitudinal vertical partition in said trough, said partition terminating short of the aforesaid end of the trough in a narrow plow point formed by having its upper end extend at an oblique angle to the bottom of the trough to the plane of the under surface of a link lying in the trough so that as a link slides along the trough said plow point projects under it along its longitudinal medial line and tilts one edge of the link upward to bring the link toward an upright position on the other side of said partition from that on which said edge originally lay, said medial partition extending to the lower end of said trough so as to provide with the sides thereof two trough portions, and said two trough portions each being of proper width to receive single links edgewise but to prevent overlapping of such links, so that links may accumulate in said trough portions with their adjacent ends abutting without overlapping.

4. A positioning device for silent chain links, comprising a trough of proper width at one end to allow a silent chain link to lie longitudinally flatwise therein but to prevent it from lying crosswise therein, so that the points of the link are necessarily toward one side or the other of the trough, a medial longitudinal vertical partition in said trough, said partition terminating short of the aforesaid end of the trough in a narrow plow point formed by having its upper edge extend at an oblique angle to the bottom of the trough to the plane of the under surface of a link lying in the trough so that as a link slides along the trough said plow point projects under it along its longitudinal medial line and tilts one edge of the link upward to bring the link toward an upright position on the other side of said partition from that on which said edge originally lay, the sides of said trough converging below the upper end of said plow point, said medial partition extending to the lower end of said trough so as to provide with the sides thereof two trough portions, and said two trough portions each being of proper width to receive single links edgewise but to prevent overlapping of such links, so that links may accumulate in said trough portions with their adjacent ends abutting without overlapping.

5. A positioning device for silent chain links, comprising a trough of proper width at one end to allow a silent chain link to lie longitudinally flatwise therein but to prevent it from lying crosswise therein, so that the points of the link are necessarily toward one side or the other of the trough, and a medial longitudinal vertical partition in said trough, said partition terminating short of the aforesaid end of the trough in a narrow plow point formed by having its upper end extend at an oblique angle to the bottom of the trough to the plane of the under surface of a link lying in the trough so that as a link slides along the trough said plow point projects under it along its longitudinal medial line and tilts one edge of the link upward to bring the link toward an upright position on the other side of said partition from that on which said edge originally lay, said medial partition extending to the lower end of said trough so as to provide with the sides thereof two trough portions.

6. A positioning device for silent chain links, comprising a trough of proper width at one end to allow a silent chain link to lie longitudinally flatwise therein but to prevent it from lying crosswise therein, so that the points of the link are necessarily toward one side or the other of the trough, and a medial longitudinal vertical partition in said trough, said partition terminating short of the aforesaid end of the trough in a narrow plow point formed by having its upper edge extend at an oblique angle to the bottom of the trough to the plane of the under surface of a link lying in the trough so that as a link slides along the trough said plow point projects under it along its longitudinal medial line and tilts one edge of the link upward to bring the link toward an upright position on the other side of said partition from that on which said edge originally lay, the sides of said trough converging below the upper end of said plow point, said medial partition extending to the lower end of said trough so as to provide with the sides thereof two trough portions.

7. A positioning device for silent chain links, comprising a trough of proper width at one end to allow a silent chain link to lie longitudinally flatwise therein but to prevent it from lying crosswise therein, so that the points of the link are necessarily toward one side or the other of the trough, and a medial longitudinal vertical partition in said trough, said partition terminating short of the aforesaid end of the trough in a narrow plow point formed by having its upper end extend at an oblique angle to the bottom of the trough to the plane of the under surface of a link lying in the trough so that as a link slides along the trough said plow point projects under it along its longitudinal medial line and tilts one edge of the link upward to bring the link toward an upright position on the other side of said partition from that on which said edge originally lay, the sides of the troughs and said medial partition forming trough portions which are wide enough to receive silent chain links edgewise but too narrow to receive them flatwise.

8. A positioning device for silent chain links, comprising a trough of proper width at one end to allow a silent chain link to lie longitudinally flatwise therein but to prevent it from lying crosswise therein, so that the points of the link are necessarily toward one side or the other of the trough, and a medial longitudinal vertical partition in said trough, said partition terminating short of the aforesaid end of the trough in a narrow plow point formed by having its upper edge extend at an oblique angle to the bottom of the trough to the plane of the under surface of a link lying in the trough so that as a link slides along the trough said plow point projects under it along its longitudinal medial line and tilts one edge of the link upward to bring the link toward an upright position on the other side of said partition from that on which said points originally lay, the sides of said trough converging below the upper end of said plow point, the sides of the troughs and said medial partition forming trough portions which are wide enough to receive silent chain links edgewise but too narrow to receive them flatwise.

9. A positioning device for silent chain links, comprising means for bringing links to a flatwise position with their longitudinal medial lines in approximately the same vertical plane, and a narrow plow point having an inclined upper surface and arranged in said plane so as to project under the links along their longitudinal medial lines and thereby tilt one edge of the links upward by reason of the location of the center of gravity of each link on the opposite side of its longitudinal medial line from such edge.

10. A positioning device for flat members which are of greater length than width and are unbalanced about their longitudinal medial lines, comprising means for bringing said unbalanced members to positions where they lie flatwise with their longitudinal medial lines in approximately the same vertical plane, and a narrow plow point having an inclined upper edge arranged in said vertical plane to project under said members along their longitudinal medial lines and thereby to tilt such members so that the portions lying on the opposite sides of said longitudinal medial lines from the centers of gravity of such members are upward.

11. A positioning device for silent chain links, comprising means for bringing links to a flatwise position with their longitudinal medial lines in approximately the same vertical plane, and a narrow support which engages the under surfaces of said links along their longitudinal medial lines and raises them along such lines relative to one longitudinal edge and thereby tilts the opposite edge of the links upward by reason of the location of the center of gravity of each link on the opposite side of its longitudinal medial line from such latter edge.

12. A positioning device for flat members which are of greater length than width and are unbalanced about their longitudinal medial lines, comprising means for bringing said unbalanced members to positions where they lie flatwise with their longitudinal medial lines in approximately the same vertical plane, and a narrow support which engages the under surfaces of said members along their longitudinal medial lines and raises them along such lines relative to one longitudinal edge and thereby tilts such members so that the portions lying on the opposite sides of said longitudinal medial lines from the centers of gravity of such members are upward.

13. A positioning device for silent chain links, comprising means for bringing links to a flatwise position with their longitudinal medial lines in approximately the same plane transverse to the plane of such links, and means for causing unbalanced forces to act on such links on opposite sides of their longitudinal medial lines so that the link edges which lie on the opposite side of said longitudinal medial lines from the centers of gravity of such links are moved in a given direction from their initial positions.

14. A positioning device for flat members which are of greater length than width and are unbalanced about their longitudinal medial lines, comprising means for bringing said unbalanced members to positions where they lie flatwise with their longitudinal medial lines in approximately the same plane transverse to the plane of such members, and means for causing unbalanced forces to act on such members on opposite sides of their longitudinal medial lines so that the portions lying on the opposite side of said longitudinal medial lines from the centers of gravity of such members are moved in a given direction from their initial positions.

15. A link-positioning device, comprising a trough formed at one end to hold links flatwise in end-to-end relationship and at the other end to hold the links edgewise in two series in end-to-end relationship, and an intermediate longitudinal partition having an inclined edge.

16. A link-positioning device, comprising a trough formed at one end to hold links flatwise in end-to-end relationship and at the other end to hold the links edgewise in end-to-end relationship, and an intermediate longitudinal partition having an inclined edge.

17. A positioning device for flat members which are unbalanced about their medial lines, comprising a trough of proper width at one end to receive such flat members flatwise with such medial lines extending longitudinally of the trough in the middle thereof, and an intermediate longitudinal partition located centrally in said trough and having an inclined upper edge.

18. A positioning device for flat members which are unbalanced about their medial lines, comprising a trough of proper width at one end to receive such flat members flatwise with such medial lines extending longitudinally of the trough in the middle thereof, and an intermediate longitudinal partition located centrally in said trough and having an inclined upper edge, the sides of the trough converging along such partition.

19. The method of positioning silent chain links, which comprises bringing said links into approximately the same plane with their longitudinal medial lines all approximately in a second plane transverse to the first, and then causing unbalanced forces to act on such links on opposite sides of their longitudinal medial lines so that the link edges which lie on the opposite side of said longitudinal medial lines from the centers of gravity of such links are moved in a given direction from their initial positions.

20. The method of positioning flat members which are of greater length than width and are unbalanced about their longitudinal medial lines, which comprises bringing said unbalanced members into approximately the same plane with their longitudinal medial lines all approximately in a second plane transverse to the first, and then causing unbalanced forces to act on such unbalanced members on opposite sides of their longitudinal medial lines so that the portions lying on the opposite side of said longitudinal medial lines from the centers of gravity of such unbalanced members are moved in a given direction from their initial positions.

21. The method of positioning silent chain links, which comprises bringing said links to positions where they lie flatwise with their longitudinal medial lines approximately in the same vertical plane, and then causing a narrow support to engage the under surfaces of said links along their longitudinal medial lines and to raise said links along such lines relative to one longitudinal edge and thereby tilt one edge of said links upward by reason of the location of the center of gravity of each link on the opposite side of its longitudinal medial line from such edge.

22. The method of positioning flat members which are of greater length than width and are unbalanced along their longitudinal medial lines, which comprises bringing said unbalanced members to positions where they lie flatwise with their longitudinal medial lines approximately in the same vertical plane, and then causing a narrow support to engage the under surfaces of said unbalanced members along their longitudinal medial lines and to raise said unbalanced members along such lines relative to one longitudinal edge and thereby tilt such members so that the portions lying on the opposite sides of said longitudinal medial lines from the centers of gravity of such members are upward.

23. A positioning device for flat members, comprising a trough of proper width at one end to receive such flat members flatwise with their medial lines extending longitudinally of the trough in the middle thereof, and an intermediate longitudinal partition located in said trough and having an inclined upper edge.

24. A positioning device for flat members, comprising a trough of proper width at one end to receive such flat members flatwise with their medial lines extending longitudinally of the trough in the middle thereof, and an intermediate longitudinal partition located in said trough and having an inclined upper edge, the sides of the trough converging along such partition.

25. A positioning device for chain links, comprising a trough of proper width at one end to allow a chain link to lie longitudinally flatwise therein but to prevent it from lying crosswise therein, and a longitudinal vertical partition in said trough, said partition terminating short of the aforesaid end of the trough in a narrow plow point formed by having its upper end extend at an oblique angle to the bottom of the trough to the plane of the under surface of a link lying in the trough so that as a link slides along the trough said plow point projects longitudinally under it and tilts one edge of the link upward to bring the link toward an upright position on the other side of said partition from that on which said edge originally lay.

26. A positioning device for chain links, comprising means for bringing links to a flatwise position with their longitudinal medial lines in approximately the same vertical plane, and a narrow plow point having an inclined upper surface and arranged to project longitudinally under the links and thereby tilt one edge of the links upward by reason of the location of the center of gravity of each link on the opposite side of said plow point from said edge.

27. A positioning device for flat members which are of greater length than width, comprising means for bringing said flat members to positions where they lie flatwise with their longitudinal medial lines in approximately the same vertical plane, and a narrow plow point having an inclined upper edge arranged to project longitudinally under said members and thereby to tilt such members so that the portions lying on the opposite side of said plow point from the centers of gravity of such members are upward.

28. A positioning device for chain links, comprising means for bringing links to a flatwise position with their longitudinal medial lines in approximately the same vertical plane, and a narrow support which engages the under surfaces of said links longitudinally and raises them relative to one longitudinal edge and thereby tilts the opposite edge of the links upward by reason of the location of the center of gravity of each link on the opposite side of such narrow support from such latter edge.

29. A positioning device for flat members which are of greater length than width, comprising means for bringing said flat members to positions where they lie flatwise with their longitudinal medial lines in approximately the same vertical plane, and a narrow support which engages the under surfaces of said members longitudinally and raises them relative to one longitudinal edge and thereby tilts such members so that the portions lying on the opposite sides of said narrow support from the centers of gravity of such members are upward.

In witness whereof, I have hereunto set my hand at Indianapolis, Indiana, this 21st day of April, A. D. one thousand nine hundred and sixteen.

HENRY E. HAYWARD.

Copies of this patent may be obtained for five cents each, by addressing the "Commissioner of Patents, Washington, D. C."